United States Patent [19]
Hanisko et al.

[11] Patent Number: 5,900,529
[45] Date of Patent: May 4, 1999

[54] APPARATUS AND METHOD FOR TESTING AN ACCELERATION SENSOR

[75] Inventors: John Cyril P. Hanisko, Southfield; Carl A. Munch, Troy, both of Mich.

[73] Assignee: TRW Inc., Lyndhurst, Ohio

[21] Appl. No.: 08/891,395

[22] Filed: Jul. 10, 1997

[51] Int. Cl.$^6$ .................................................. G01P 21/00
[52] U.S. Cl. ............................................ 73/1.38; 73/1.39
[58] Field of Search ...................................... 73/1.38, 1.39

[56] References Cited

U.S. PATENT DOCUMENTS

| | | | |
|---|---|---|---|
| 4,950,914 | 8/1990 | Kurihara et al. | 307/10.1 |
| 5,060,504 | 10/1991 | White et al. . | |
| 5,103,667 | 4/1992 | Allen et al. . | |
| 5,337,260 | 8/1994 | Spangler | 73/488 X |
| 5,375,468 | 12/1994 | Ohta et al. | 73/1.39 X |
| 5,377,523 | 1/1995 | Ohta et al. . | |
| 5,457,982 | 10/1995 | Spies et al. . | |
| 5,506,454 | 4/1996 | Hanzawa et al. | 307/10.1 |
| 5,753,793 | 5/1998 | Lindahl et al. | 73/1.38 X |

*Primary Examiner*—Thomas F. Noland
*Attorney, Agent, or Firm*—Tarolli, Sundheim, Covell, Tummino & Szabo

[57] ABSTRACT

An apparatus (10) and an associated method for testing an acceleration sensor assembly (14), which is preferably an accelerometer assembly. An electrical exciter (34) is operated in response to an excitation signal (32) from a signal generator (30). The exciter (34) applies oscillating excitation to the accelerometer assembly (14). An initial excitation is applied to the accelerometer assembly (14) by the exciter (34). The frequency of the initial excitation is varied over a range of frequencies via a signal (62) from a frequency range sweep function (56) to the signal generator (30). The output of the accelerometer assembly (14) is monitored during application of the initial excitation over the range of frequencies. A frequency value associated with a predetermined response in the output of the accelerometer assembly (14) is stored. The exciter (34) subsequently applies a test oscillating excitation at the stored frequency value to the accelerometer assembly (14). The output of the accelerometer assembly (14) is monitored during application of the test excitation. A determination function (72) determines whether the output of the accelerometer assembly (14) provides the predetermined response during application of the test excitation and provides an output signal (74) indicative of the determination.

14 Claims, 3 Drawing Sheets

APPARATUS AND METHOD FOR TESTING AN ACCELERATION SENSOR

TECHNICAL FIELD

The present invention is generally directed to testing of an acceleration sensor, and is particularly directed to testing of an acceleration sensor which is responsive to oscillation inputs.

BACKGROUND OF THE INVENTION

Acceleration sensors are used within vehicles to control systems responsive to acceleration of the vehicle or responsive to acceleration of a component of the vehicle. For example, an acceleration sensor is used to sense acceleration which is indicative of a vehicle collision. One or more vehicle occupant restraint devices, such as air bag modules and seat belt pretensioners, are controlled in response to the sensed acceleration.

Another example of the use of an acceleration sensor in a vehicle is within an active suspension system of the vehicle. Acceleration of a sprung mass (e.g., the vehicle body) is sensed by the acceleration sensor. A hydraulic actuator is controlled in response to the sensed acceleration to enhance vehicle suspension performance.

It is possible to assess the condition of at least one type of acceleration sensor by electrically exciting the acceleration sensor, and thereby produce a response at the sensor's output. For example, one type of acceleration sensor is a capacitance-based accelerometer which has a seismic mass. The seismic mass moves in response to acceleration and also moves in response to electrical excitation. An electrical output signal is provided by the accelerometer in response to movement of the seismic mass. The capacitance-based accelerometer is tested by moving the seismic mass via an applied test (i.e., known) excitation and analyzing the output signal to see if an expected result occurs.

Often, acceleration sensor systems are mass-produced in large quantities. The large quantities correspond to the large quantities of vehicles within which the acceleration sensor systems are used. One type of acceleration sensor system which is often mass-produced has structure for testing its acceleration sensor without the aid of external equipment (i.e., the system performs a "self-test" on its acceleration sensor). A self-test acceleration sensor system can self-test its acceleration sensor as frequently as desired.

One approach used for self-test acceleration sensor system production is to configure all of the produced systems to have a standard (i.e., identical) test excitation. Unit-to-unit variation may occur among the outputs of several acceleration sensors in response to a standard self-test excitation despite the fact that all of the acceleration sensors are properly functioning.

SUMMARY OF THE INVENTION

The present invention provides an apparatus for testing an acceleration sensor. Means applies an initial oscillating excitation to the acceleration sensor. Means varies the oscillation frequency of the initial excitation over a range of frequencies. Means monitors an output of the acceleration sensor during application of the initial excitation over the range of frequencies. Means stores a frequency value associated with a predetermined response in the output of the acceleration sensor. Means applies a test oscillating excitation at the stored frequency value to the acceleration sensor. Means monitors the output of the acceleration sensor during application of the test excitation. Means determines whether the output of the acceleration sensor provides the predetermined response during application of the test excitation and provides a signal indicative of the determination.

The present invention further provides a method for testing an acceleration sensor. An initial oscillating excitation is applied to the acceleration sensor. The oscillation frequency of the initial excitation is varied over a range of frequencies. An output of the acceleration sensor is monitored during application of the initial excitation over the range of frequencies. A frequency value associated with a predetermined response in the output of the acceleration sensor is stored. A test oscillating excitation at the stored frequency value is applied to the acceleration sensor. The output of the acceleration sensor is monitored during application of the test excitation. A determination is made whether the output of the acceleration sensor provides the predetermined response during application of the test excitation. A signal is provided which is indicative of the determination.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF THE PREFERRED EMBODIMENT

Figure 1:
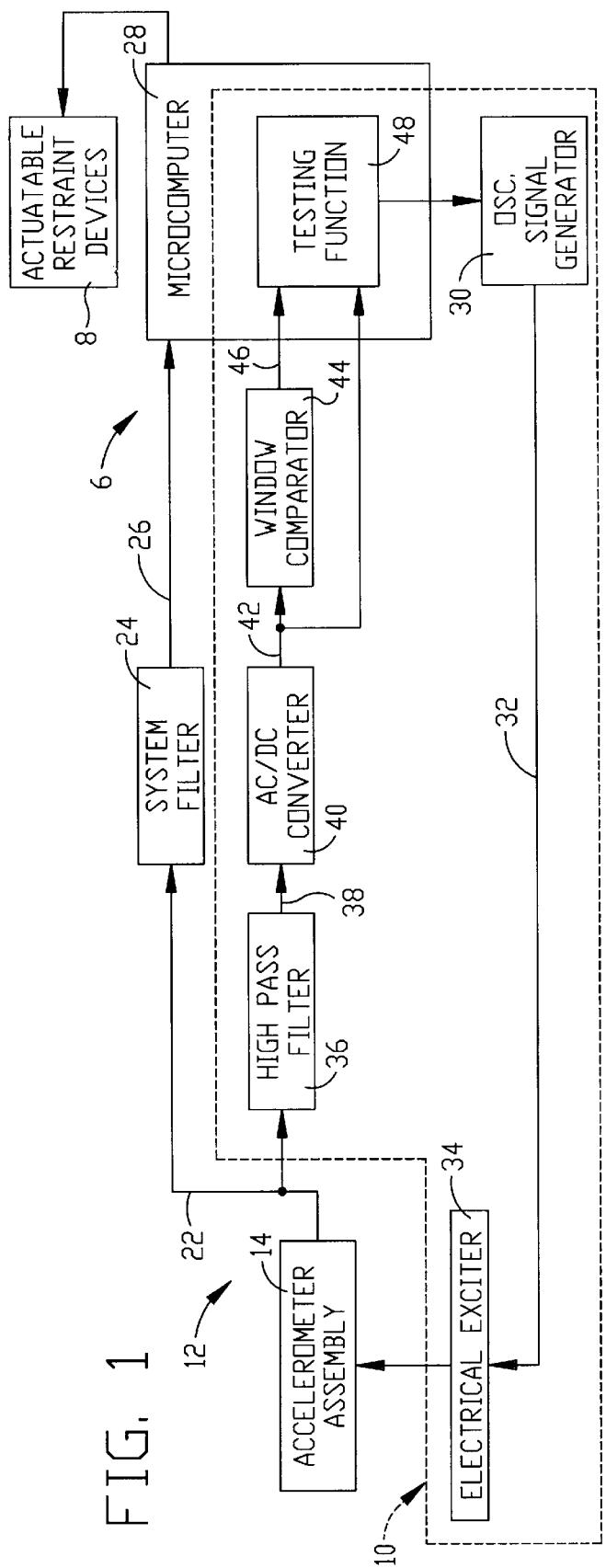
FIG. 1 is a schematic illustration of an acceleration sensor system within a vehicle occupant restraint system, the acceleration sensor system has a testing apparatus in accordance with the present invention.

One representation of the present invention is schematically shown in FIG. 1 as a testing apparatus 10 within an acceleration sensor system 12. The acceleration sensor system 12 is part of a vehicle system 6 which is responsive to sensed acceleration. In the illustrated example, the vehicle system 6 is a vehicle occupant restraint system 6 having at least one actuatable occupant restraint device 8 (e.g., an air bag module). It will be appreciated by a person of ordinary skill in the art that the present invention may be used in another system which is responsive to sensed acceleration (e.g., a vehicle active suspension system).

Figure 2:
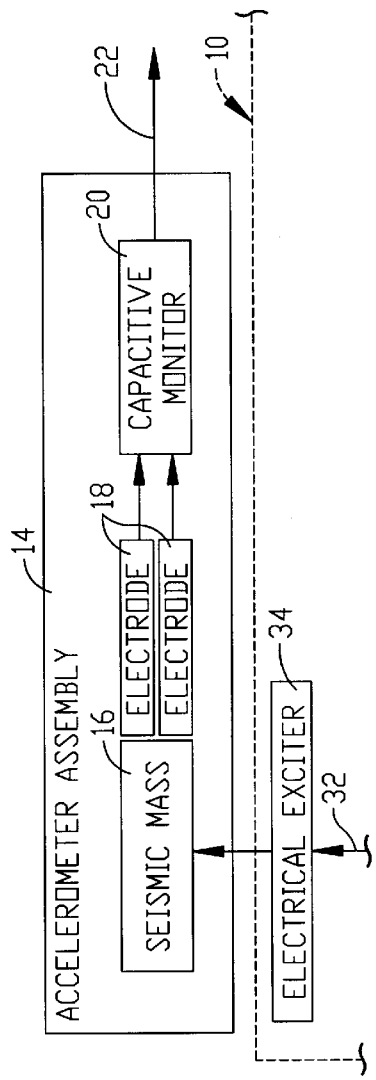
FIG. 2 is a schematic illustration of an accelerometer within the acceleration sensor system shown in FIG. 1.

The acceleration sensor system 12 includes an acceleration sensor assembly 14, and in the preferred embodiment, the acceleration sensor assembly is an accelerometer assembly. The accelerometer assembly 14 (FIG. 2) has a movable seismic mass 16 and a pair of spaced apart pick-ups or electrodes 18 which form a capacitor having a variable capacitance value. The seismic mass 16 moves in response to applied acceleration and movement of the mass changes the capacitance value. Accordingly, the seismic mass 16 and the electrodes 18 are a capacitance-based accelerometer of the assembly 14. In the preferred embodiment, the accelerometer assembly 14 is a micromachined capacitance-based accelerometer assembly.

The amplitude and frequency of deflection (i.e., movement from a neutral position) of the mass 16 are related to the amplitude and frequency of the disturbance force (e.g., acceleration) causing the deflection of the mass. The mass 16 acts as a damped spring mass which has a response that is modeled by:

$$\frac{1}{\sqrt{\left(1-\frac{f^2}{f_o^2}\right)^2 + 4\left(\zeta^2\left(\frac{f}{f_o}\right)\right)^2}}$$

wherein:
f=the applied frequency (e.g., the frequency of the disturbance force applied to the mass 16);
$f_o$ the natural frequency of the mass 16; and
$\zeta$=the damping coefficient.

A maximum amplitude in the deflection of the mass 16 for a given amplitude of an applied disturbance force occurs when the disturbance force is applied at the natural frequency of the mass.

A capacitive monitor 20 detects the capacitance value of the accelerometer and provides an electrical output signal 22 which is indicative of the capacitance value. Specifically, the output signal 22 has a voltage value which is functionally related to the capacitance value. Accordingly, the voltage of the output signal 22 is indicative of the amount of deflection of the mass 16. Further, the output signal 22 has a frequency related to the frequency of the deflection of the mass 16.

The output signal 22 of the capacitive monitor 20 is applied to a system filter 24 (FIG. 1), which is a bandpass filter. The system filter 24 permits passage of signals with frequencies within a predetermined band of frequencies. The band of frequencies which are passed by the system filter 24 are those frequencies which are useful to determine whether certain types of acceleration are applied to the accelerometer assembly 14. In the illustrated example, the acceleration sensor system 12 is part of the vehicle occupant restraint system 6, thus, the frequencies which are passed by the system filter 24 are those frequencies which are useful for determining whether the acceleration applied to the accelerometer assembly is indicative of a vehicle collision. Typically, the frequencies which are useful for determining whether the acceleration is indicative of a vehicle collision (i.e., passed by the system filter 24) are not near the natural frequency $f_o$ of the mass 16. In other words, the accelerometer of the assembly 14 is selected from a type having its natural frequency value outside of the band of frequencies indicative of a vehicle collision.

A microcomputer 28 processes the system filter's output signal 26 to determine the acceleration applied to the accelerometer assembly 14. The determination by the microcomputer 28 with regard to acceleration is used to determine whether to actuate the restraint device(s) 8. For example, within the vehicle occupant restraint system 6, upon a determination that the acceleration is indicative of a particular type of vehicle collision, the restraint device(s) 8 is activated. A person of ordinary skill in the art will appreciate and understand the control of the restraint device actuation.

The testing apparatus 10 includes a signal generator 30 which is controlled by the microcomputer 28. The signal generator 30 provides an oscillating electrical excitation signal 32. The amplitude of the excitation signal 32 is preset and the frequency of the excitation signal is adjustable over a range of frequencies. In the preferred embodiment, the range of frequencies for the excitation signal 32 is outside of the range of vehicle collision indicative frequencies. Specifically, the range of frequencies for the excitation signal 32 is above the range of collision indicative frequencies. The range of frequencies for the excitation signal 32 contains the natural frequency $f_o$ of the mass 16.

The excitation signal 32 is supplied to an electrical exciter 34. The exciter 34 causes movement or deflection of the mass 16 of the accelerometer assembly 14 in response to the excitation signal 32. In one embodiment, the mass 16 is made of electrically conductive material and the exciter 34 produces an oscillating electro-static field which is applied to the mass 16. The electro-static field causes an oscillating deflection of the mass 16. The frequency of the oscillations of the mass 16 caused by the exciter 34, and as detected by the electrodes 18, is related to the frequency of the excitation signal 32. Also, the magnitude of the oscillations of the mass 16 is related to the magnitude of the excitation signal 32.

It will be appreciated by a person of ordinary skill in the art that the output signal 22 from the capacitive monitor 20 may have a component with a frequency and a magnitude related to acceleration-induced movement of the mass 16 (e.g., as would occur during a vehicle collision) and a component with a frequency and a magnitude related to the excitation-induced movement of the mass (e.g., as would occur during an accelerometer test). The two separate frequency components may occur at different times or simultaneously.

The testing apparatus 10 further includes a high-pass filter 36 which is connected to receive the output signal 22 provided by the capacitive monitor 20 of the accelerometer assembly 14. The high-pass filter 36 permits passage of signals with frequencies above a predetermined frequency. Specifically, the frequencies which are passed by the high-pass filter 36 are those frequencies which are associated with excitation-induced movement of the mass 16 rather than acceleration-induced movement of the mass that would occur from a vehicle collision.

Figure 3:
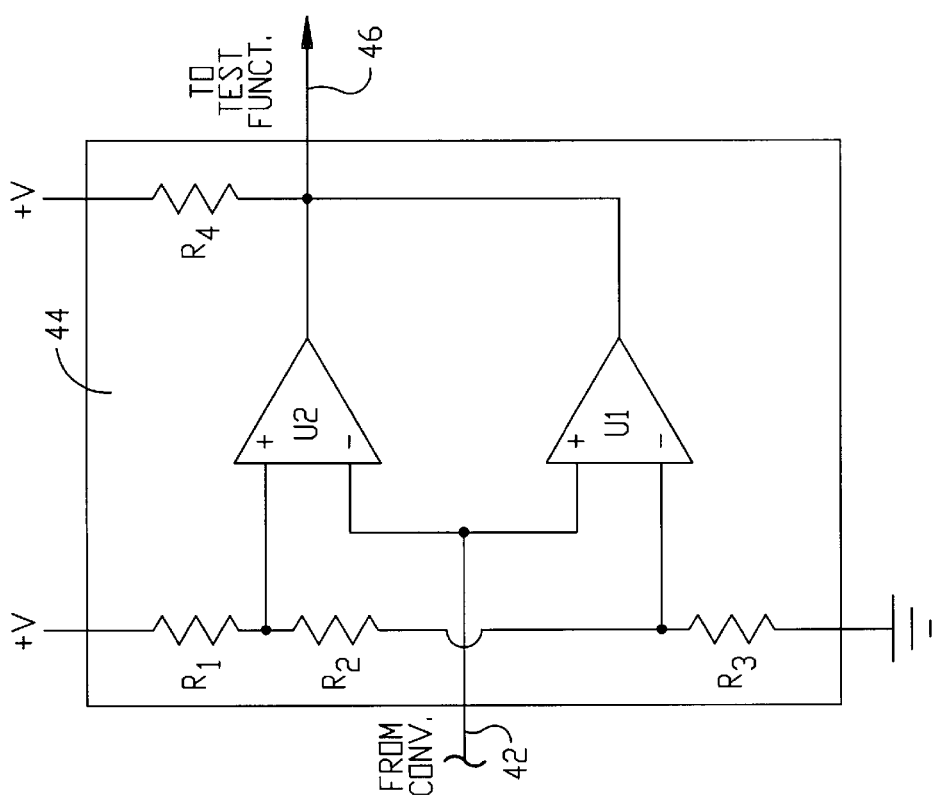

The output signal 38 of the high-pass filter 36 is applied to an AC/DC converter 40. The output signal 42 from the converter 40 has a positive DC voltage value indicative of the amplitude of the oscillating output signal 38 from the high-pass filter 36. The output signal 42 from the converter 40 is applied to a voltage window comparator 44. The illustrated example of the present invention incorporates the window comparator 44 shown in FIG. 3. The lower and upward voltage limits, $V_1$ and $V_2$ respectively, of the window range of the window comparator 44 shown in FIG. 3 are given by:

$$\frac{R_3}{R_1 + R_2 + R_3}$$
and
$$\frac{R_2 + R_3}{R_1 + R_2 + R_3}$$

respectively, wherein, $R_1$, $R_2$, and $R_3$ are the values of the resistors of the comparator. The comparator 44 provides an output signal 46 which has a HIGH value when the voltage value of the output signal 42 from the converter 40 is within the range of voltage values (i.e., within the window) set within the comparator 44. Otherwise, the output signal 46 from the comparator 44 is LOW.

The lower and upper limits $V_1$, $V_2$ of the comparator 44 are selected prior to manufacture of the comparator and are based upon an expectation of performance of the accelerometer assembly 14. Specifically, for a group of manufactured accelerometer assemblies 14 (e.g., a mass-production run), there is an expected mass natural frequency and an expected output signal 22 peak amplitude at the expected mass natural frequency in response to a disturbance force of given amplitude. However, within the group of accelerometer assemblies 14, the masses 16 of the accelerometers may have slightly different mass natural frequencies and the output signals 22 of the accelerometer assemblies may have slightly different peak amplitudes at their respective mass natural frequencies in response to the disturbance force of given amplitude. These differences are commonly referred to as unit-to-unit variations.

Despite the fact that the response outputs may vary, all of the accelerometer assemblies 14 provide similar response outputs (i.e., a damped oscillator response) and the response outputs of all of the accelerometer assemblies have some identical aspects. Specifically, in response to a disturbance force of given amplitude, each accelerometer assembly 14 provides its output signal 22 at a certain amplitude, so long as an appropriate disturbance force frequency is selected and so long as the certain amplitude is selected to be below the smallest peak amplitude within the group of accelerometers.

Accordingly, the lower and upper limits $V_1$, $V_2$ of the window comparator 44 are selected to correspond to two (i.e., a first and a second) chosen output signal amplitudes, respectively, which are below the smallest peak amplitude within the group of acceleration assemblies. In one embodiment, the upper limit $V_2$ is as close as practical to a value corresponding to the expected peak amplitude of the output signal 22, (e.g., just below the smallest peak amplitude within the group of accelerometers) and the lower limit $V_1$ is slightly below the upper limit.

The output signal 42 (FIG. 1) from the converter 40 and the output signal 46 from the comparator 44 are provided to a testing function 48 within the microcomputer 28. The testing function 48 (FIG. 4) includes a frequency range sweep function 56, a test frequency selection function 58 and a frequency and magnitude memory function 60.

A signal 62 from the sweep function 56 and a signal 64 from the memory function 60 are used to control the signal generator 30. Specifically, the signal 62 from the sweep function 56 includes a frequency value which begin at $f_{START}$ and which is progressively varied from $f_{START}$ to $f_{END}$ over a period of time. In response to the signal 62 from the sweep function 56, the signal generator 30 provides the excitation signal 32 during the sweep time period. The frequency of the excitation signal is progressively varied from $f_{START}$ to $f_{END}$ over this time period.

The signal 64 from the memory function 60 includes a determined test frequency value $f_{TEST}$. In response to the signal 64 from the memory function 60, the signal generator 30 provides the test excitation signal 32 at the frequency $f_{TEST}$ for a period of time. A multiplexer 70 receives the signals 62 and 64, and provides only one of the signals 62, 64 to the signal generator 30 at a time.

The output signal 42 from the converter 40 and the output signal 46 from the comparator 44 are supplied to the selection function 58. A signal 66 from the sweep function 56 is also provided to the selection function 58. The signal 66 contains the frequency value which is simultaneously being provided in the signal 62. The selection function 58 monitors the output signal 42 and the output signal 46 as functions of the frequency provided by the signal 66 of the sweep function 56.

The selection function 58 identifies a frequency associated with the output signal 46 of the comparator 44 being HIGH. Specifically, in one embodiment, the selection function 58 determines the frequencies from the sweep function 56 that correspond with passage through the lower and upper limits of the comparator 44 (i.e., when the output signal 46 toggles, LOW-HIGH and HIGH-LOW) and averages the two frequency values. The determined average frequency is associated with a voltage value at or near the center of the window of the comparator 44. The selection function 58 provides a signal 68 to the memory function 60 which contains the determined average frequency value. The memory function 60 stores the determined average frequency value as the test frequency value $f_{test}$. The memory function 60 also holds the average magnitude of the voltage values associated with the upper and lower limits of the window comparator 44. The average voltage magnitude value is provided to the memory function 60 during manufacture.

The testing function 48 includes an operation determination function 72 which utilizes the output signal 42 from the converter 40 and the output signal 46 from the comparator 44. The determination function 72 determines the operability of the accelerometer assembly 14 and provides an output signal 74 indicative of the accelerometer's operability. Specifically, the determination function 72 monitors whether the output signal 46 of the comparator 44 toggles to HIGH when the mass 16 is electrically excited via the signal generator 30 providing the excitation signal 32 at the test frequency $f_{TEST}$.

Further, the determination function 72 receives a signal 76 from the memory function 60 which contains the average voltage magnitude value stored within the memory function. Because the test frequency value $f_{TEST}$ is the average of the frequencies $f_1$ and $f_2$ at the upper and lower limits of the window comparator 44, the average voltage magnitude value is at or near the voltage value in the output signal 42 which is produced in response to excitation at the test frequency $f_{TEST}$. The determination function 72 determines whether the voltage of the output signal 42 is comparable with the average voltage magnitude value from the memory function 50. For example, the determination function 72 determines whether the voltage of the output signal 42 does not differ from the average voltage magnitude value by greater than a small, predetermined amount. A LOW output signal 46 and/or a determination that the voltage is not comparable to the average voltage magnitude value is indicative of degradation of the accelerometer assembly 14.

It will now be appreciated by a person of ordinary skill in the art, that the testing function 48 selects a test frequency $f_{TEST}$ for the particular accelerometer assembly 14 and, once the test frequency is selected, determines the operating status of the accelerometer assembly 14 utilizing the test frequency. Specifically, upon a first, initial activation of the acceleration sensor system 12, the testing function 48 is activated to cause an initiation procedure or sequence. The initiation procedure is a once-only procedure and is performed the first time the acceleration sensor system 12 is activated. During the initiation sequence, the multiplexer 70 enables the sweep function 56 to provide its signal 62 to the signal generator 30. The excitation signal 32 of the signal generator 30 is provided to the exciter 34, and the frequency of the excitation signal is swept though the range $f_{START}$ to $f_{END}$.

Figure 4:
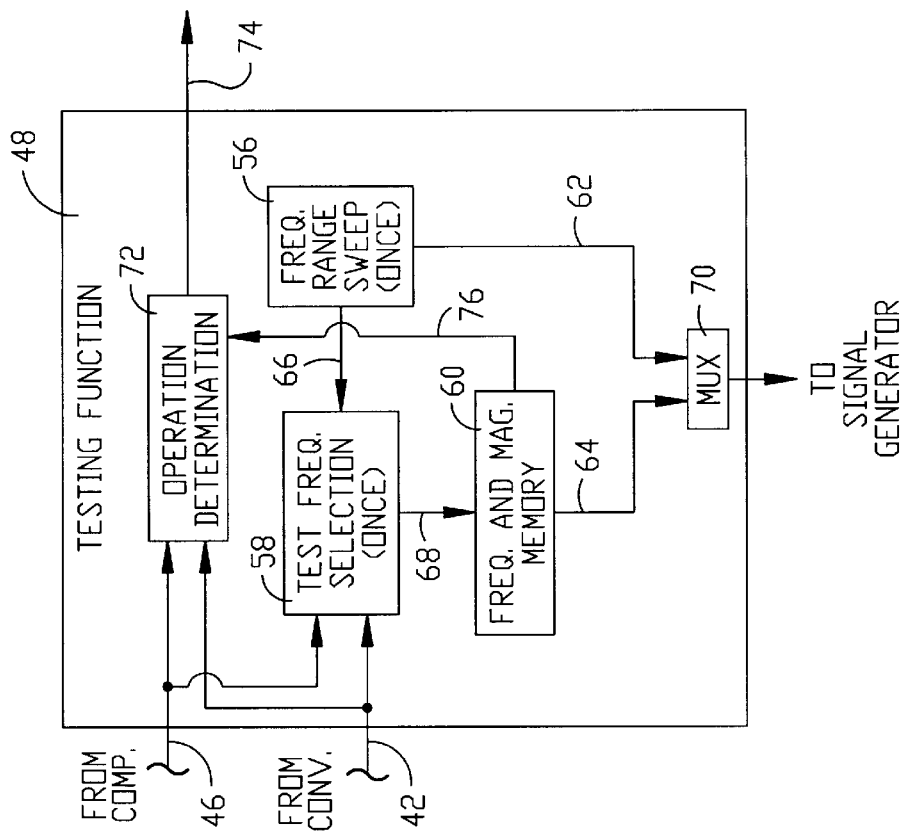
FIGS. 3 and 4 are schematic illustrations of portions of the testing apparatus shown in FIG. 1.
Figure 5:
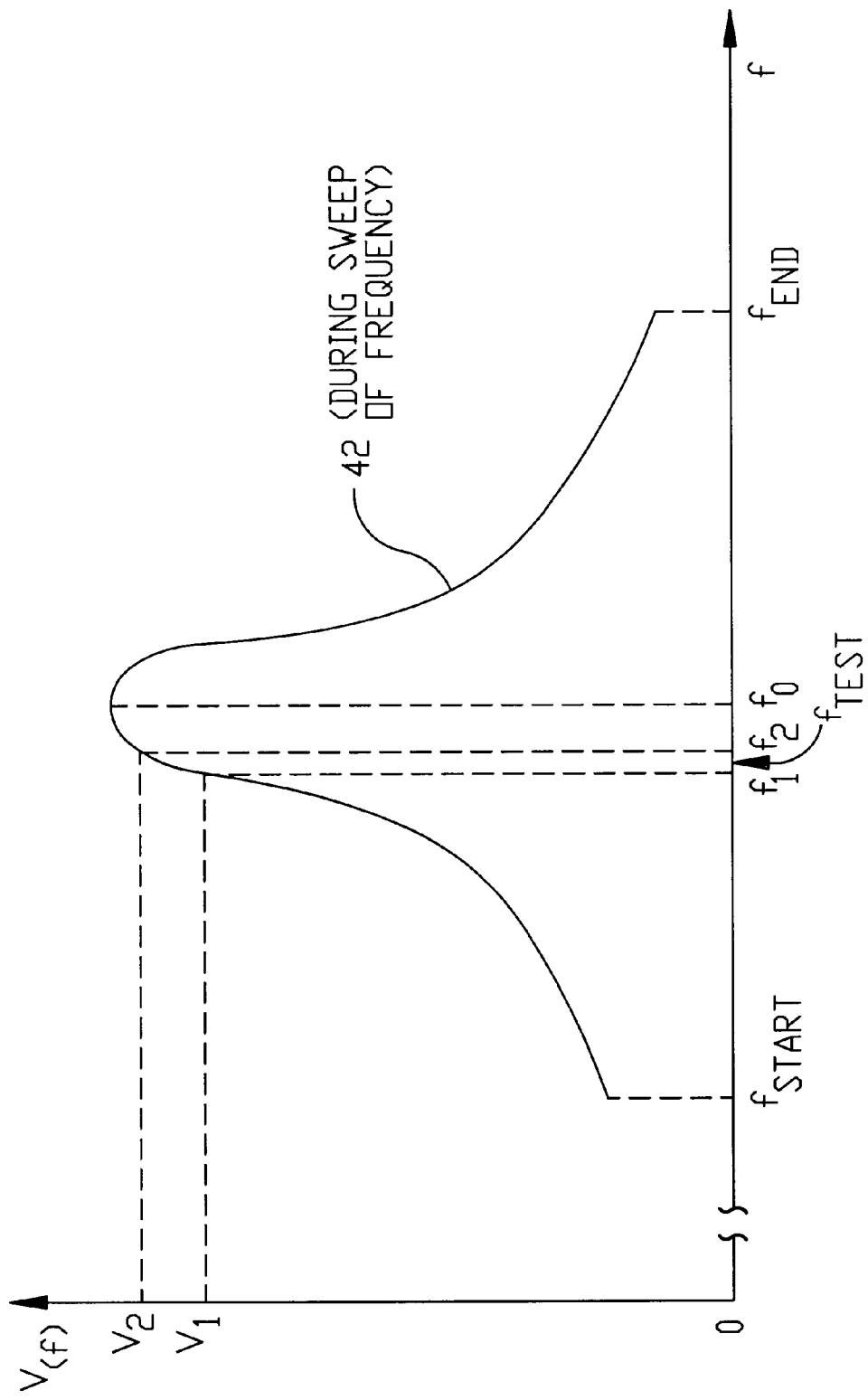
FIG. 5 is a graphical representation of a signal derived from an output signal of the accelerometer shown in FIG. 2 during an initiation procedure.

The frequency of the components of the output signal 22 which result from the electrical excitation proceed through the high-pass filter 36, and the output signal 38 from the high-pass filter 36 is provided to the converter 40. The output signal 42 of the converter 40 for the initiation sequence is, in effect, plotted as shown in FIG. 5. The output signal 42 is provided to the test frequency selection function 58 (FIG. 4). Within the selection function 58, when the output signal 46 from the window comparator 44 toggles to HIGH (i.e., when the voltage reaches the first voltage $V_1$, see FIG. 5), the frequency $f_1$, as provided by the signal 66 (FIG. 4) from the frequency range sweep function 56, is read. When the output signal 46 from the window comparator 44 toggles to LOW (i.e., when the second voltage $V_2$ is reached, see FIG. 5) a second frequency $f_2$ is read from the signal 66 (FIG. 4) of the frequency range sweep function 56. The average of the first and second frequencies $f_1$ and $f_2$ is then calculated and stored in the memory function 60 as the test frequency $f_{TEST}$.

As shown in FIG. 5, the voltage of the output signal 42 has a peak at the natural frequency $f_o$ of the mass 16. The voltages $V_1$ and $V_2$ are near, yet below, the peak voltage. As will now be appreciated by a person of skill in the art, the peak voltage need not be determined to determine the operability of the accelerometer assembly 14.

Once the initiation sequence is completed, the multiplier 70 (FIG. 4) disables communication between the sweep function 56 and the signal generator 30. The acceleration sensor system 12 (FIG. 1) is ready to monitor acceleration and the testing apparatus 10 is ready to periodically monitor performance of the accelerometer assembly 14 (i.e., monitor for accelerometer degradation). Specifically, the testing apparatus 10 monitors whether the accelerometer assembly 14 provides an output at the determined frequency and the determined amplitude, as established during the initiation sequence, in response to excitation at the frequency $f_{TEST}$. The "test" of the accelerometer assembly 14 can be performed at any desired time interval.

During operation of the acceleration sensor system 12, acceleration which is applied to the accelerometer assembly 14, such as a vehicle collision, results in an output signal 22 with frequency components that pass through the system filter 24 to the microcomputer 28. The microcomputer 28 analyzes the output signal 46 and provides control output signals to the associated restraint device(s) 8.

The testing apparatus 10 tests the accelerometer assembly 14, even if acceleration is being applied to the accelerometer assembly. Specifically, the memory function 60, via the multiplexer 70, supplies the test frequency to the signal generator 30 and the signal generator provides the excitation signal 32 at the test frequency $f_{TEST}$ even when the accelerometer may be subject to an acceleration. The electrical exciter 34 excites the mass at the test frequency $f_{TEST}$ and the components of the output signal 22 caused by the electrical excitation results in the output signal 42. Frequency components that may be in the output signal 22 as a result of an acceleration are not passed through high-pass filter 36. The amplitude of the output signal 42 is dependent upon the deflection of the mass 16 at the test frequency and is not dependent upon deflection components that may be present as a result of an acceleration.

The output signal 42 is applied to the comparator 44 and the comparator provides its output signal 46 to the determination function 72. If the amplitude of the output signal 42 is within the range of the comparator 44, the output signal 46 from the comparator is HIGH. If the output signal 46 is HIGH and if the magnitude of the output signal 42 from the converter 40 is comparable (e.g., closely approximate) with the stored average voltage magnitude value from the memory function 60, the determination function 72 will provide a HIGH output signal 74 which indicates that the accelerometer assembly 14 is operating within normal parameters.

If the output signal 42 is outside of the established window, (i.e., above or below the window limits) of the comparator 44, the output signal 46 is be LOW and the determination function 72 provides a LOW signal 74 indicating that the accelerometer assembly is not operating within normal parameters. If the output signal 42 is within the established window, (i.e., the output signal 46 is HIGH), but the magnitude of the output signal 42 from the converter 40 is not comparable with the stored value from the memory function 60, the determination function 72 provides a LOW output signal 74 to indicate that the accelerometer assembly is operating at a degraded level.

It should now be appreciated by a person of ordinary skill in the art that the testing apparatus 10 may perform tests on the accelerometer assembly 14 while the accelerometer assembly is receiving affects of acceleration. This is due to the use of the system filter 24 and the high-pass filter 36. Further, it should now be appreciated by a person of ordinary skill in the art that unit-to-unit variation between accelerometer assemblies is compensated by each associated testing apparatus 10 selecting a test frequency $f_{TEST}$ based upon response from that particular accelerometer assembly.

From the above description of the invention, those skilled in the art will perceive improvements, changes and modifications. For example, the selection function 58 need not utilize the output signal 42 from the converter 40 to determine the test frequency $f_o$. Such a determination could be made utilizing only the output signal 46 from the comparator 44. Also, for example, the operation determination function 72 can make an operability determination based upon only the output signal 46 of the comparator 44. Such improvements, changes and modifications within the skill of the art are intended to be covered by the appended claims.

Having described the invention, the following is claimed:

1. An apparatus for testing an acceleration sensor, said apparatus comprising:

means for applying an initial oscillating excitation to the acceleration sensor;

means for varying the oscillation frequency of said initial excitation over a range of frequencies;

means for monitoring an output of the acceleration sensor during application of said initial excitation over the range of frequencies;

means for storing a frequency value associated with a predetermined response in the output of the acceleration sensor;

means for applying a test oscillating excitation at said stored frequency value to the acceleration sensor;

means for monitoring the output of the acceleration sensor during application of said test excitation; and means for determining whether the output of the acceleration sensor provides the predetermined response during application of said test excitation and for providing a signal indicative of the determination.

2. An apparatus as set forth in claim 1, wherein the output of the acceleration sensor has a frequency related to acceleration when acceleration is applied to the acceleration sensor and has a frequency related to a frequency of applied excitation when excitation is applied to the acceleration sensor, the frequency of the output of the acceleration sensor responsive to said test excitation being outside of a range of frequencies of the output of the acceleration sensor responsive to acceleration.

3. An apparatus as set forth in claim 1, wherein the output of the acceleration sensor is an electrical signal, said means for monitoring an output of the acceleration sensor during application of said initial excitation includes means for monitoring an amplitude of said electrical signal.

4. An apparatus as set forth in claim 3, wherein said predetermined response in the output of the acceleration sensor associated with said test frequency is an amplitude of said electrical signal within a predetermined range.

5. An apparatus as set forth in claim 3, wherein said means for monitoring the output of the acceleration sensor during application of said test excitation includes means for monitoring an amplitude of said electrical signal, said means for determining includes means for determining when the amplitude of said electrical signal is within a predetermined range.

6. An apparatus as set forth in claim 1 further including means for providing a signal to said means for monitoring the output of the acceleration sensor which is indicative of the output of the acceleration sensor responsive to applied excitation, wherein said means for providing a signal includes filter means for passing a range of frequencies associated with applied excitation to the acceleration sensor.

7. An apparatus as set forth in claim 1 further including means for providing a signal to said means for monitoring the output of the acceleration sensor which is indicative of the output of the acceleration sensor responsive to applied excitation, wherein said means for providing a signal includes an AC/DC converter.

8. An apparatus as set forth in claim 1, wherein said means for applying an initial excitation and said means for applying a test excitation are an electrical exciter for providing an electro-static field which is controlled by an electrical excitation signal.

9. An apparatus as set forth in claim 1, wherein the acceleration sensor is an accelerometer having a portion which is responsive to acceleration and which is responsive to an applied electrical excitation.

10. A method for testing an acceleration sensor, said method comprising:

applying an initial oscillating excitation to the acceleration sensor;

varying the oscillation frequency of the initial excitation over a range of frequencies;

monitoring an output of the acceleration sensor during application of the initial excitation over the range of frequencies;

storing a frequency value associated with a predetermined response in the output of the acceleration sensor;

applying a test oscillating excitation at the stored frequency value to the acceleration sensor;

monitoring the output of the acceleration sensor during application of the test excitation;

determining whether the output of the acceleration sensor provides the predetermined response during application of test excitation; and providing a signal indicative of the determination.

11. A method as set forth in claim 10, wherein the output of the acceleration sensor has a frequency related to acceleration when acceleration is applied to the acceleration sensor and has a frequency related to a frequency of applied excitation when excitation is applied to the acceleration sensor, the frequency of the output of the acceleration sensor responsive to the test excitation is outside of a range of frequencies of the output of the acceleration sensor responsive to acceleration.

12. A method as set forth in claim 10, wherein the output of the acceleration sensor is an electrical signal, said step of monitoring an output of the acceleration sensor during application of the initial excitation includes monitoring an amplitude of said electrical signal.

13. A method as set forth in claim 12, wherein the predetermined response in the output of the acceleration sensor associated with the test frequency is an amplitude of the electrical signal within a predetermined range.

14. A method as set forth in claim 12, wherein said step of monitoring the output of the acceleration sensor during application of the test excitation includes monitoring an amplitude of the electrical signal, said step of determining includes determining when an amplitude of the electrical signal is within a predetermined range.

* * * * *